Aug. 29, 1967 R. M. MATELING 3,338,372
ROTARY CAP FEEDING HOPPER
Filed Sept. 30, 1965 5 Sheets-Sheet 4
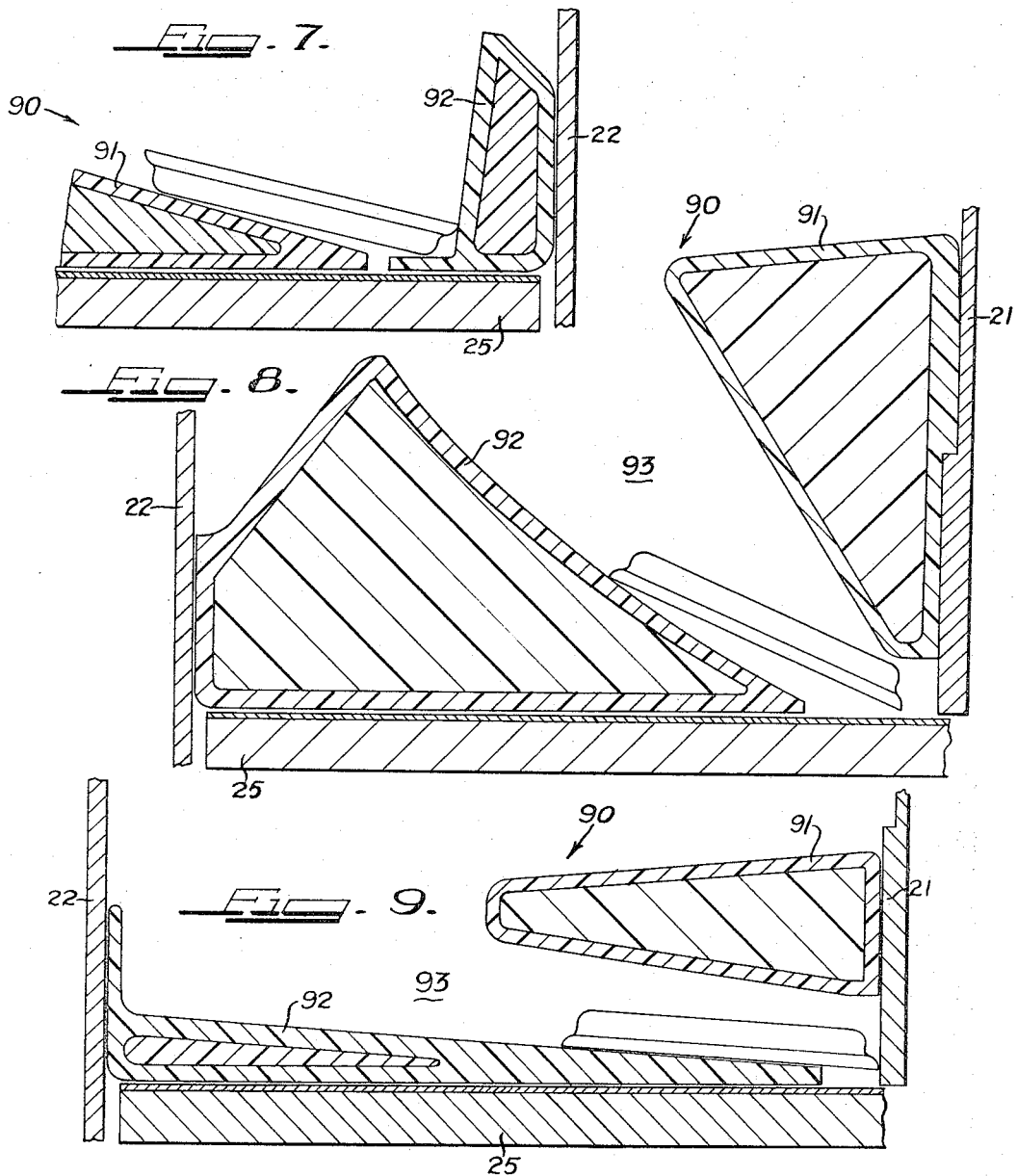
INVENTOR
RONALD M. MATELING
BY
Greist, Lockwood, Greenawalt & Dewey
Attys.

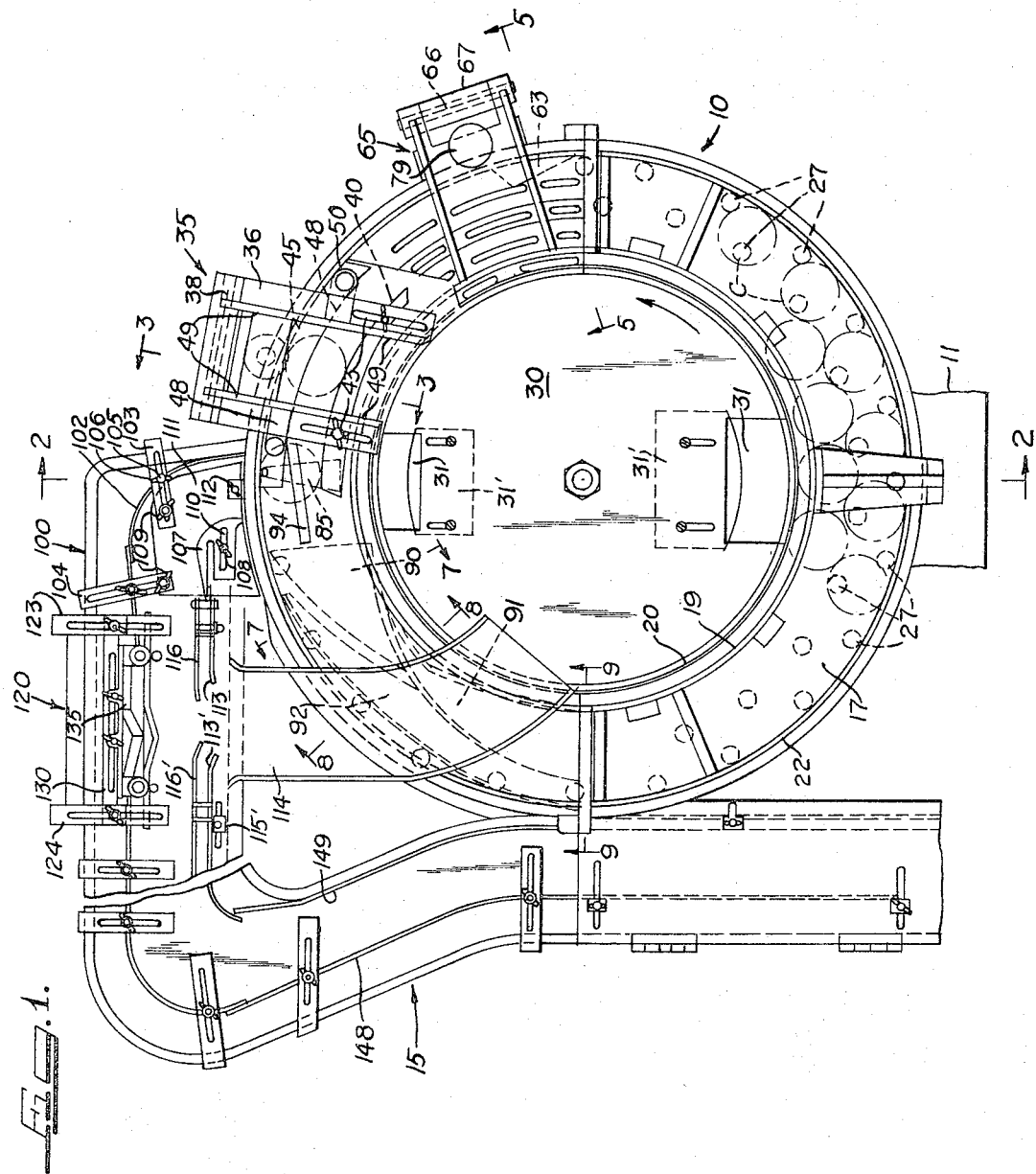

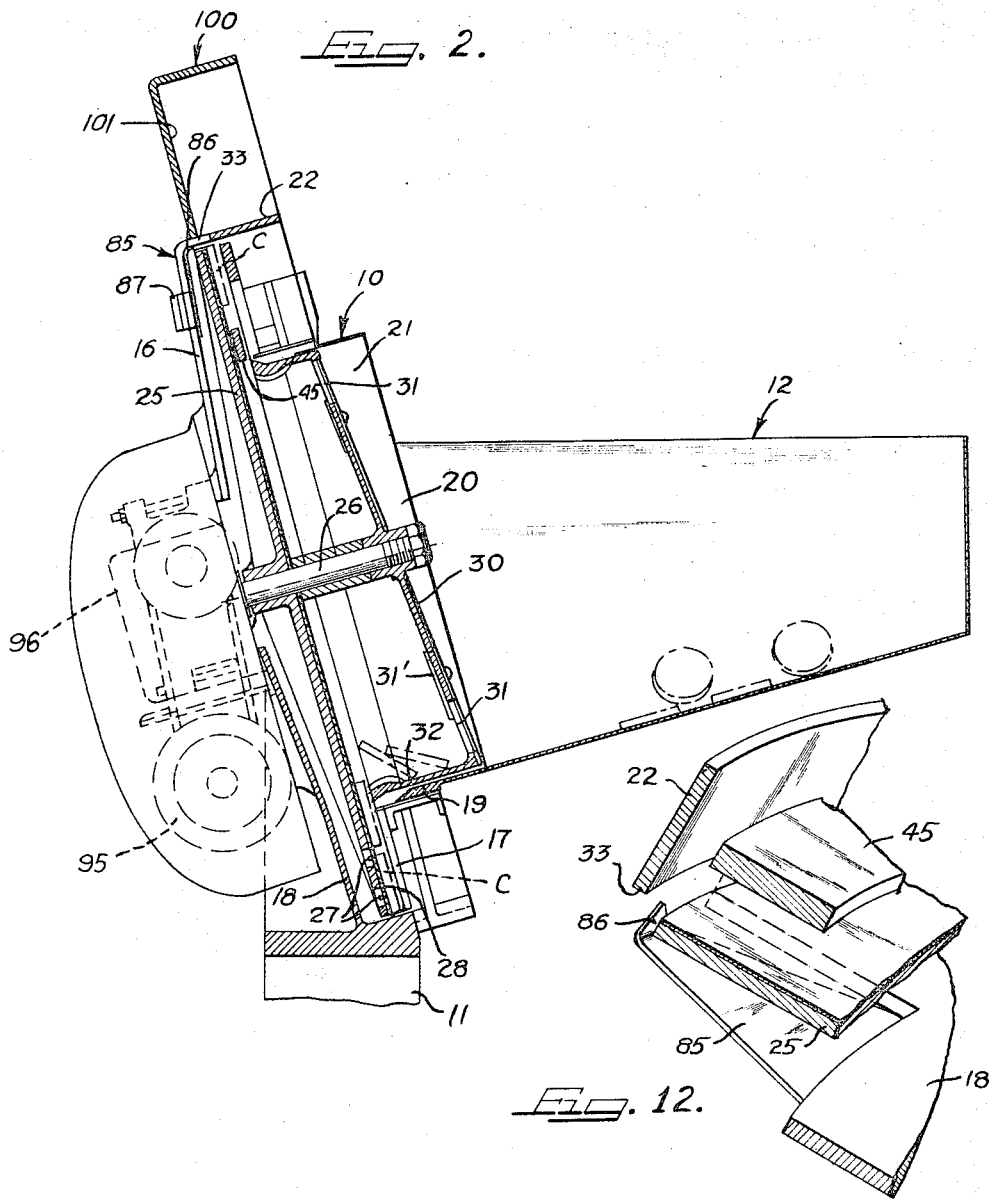

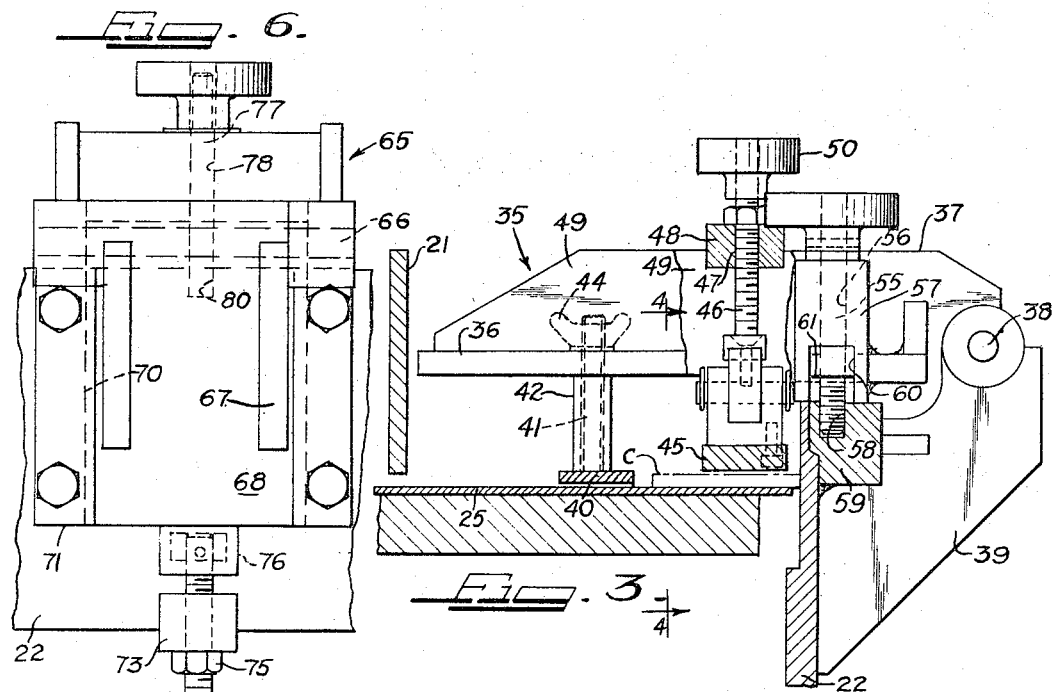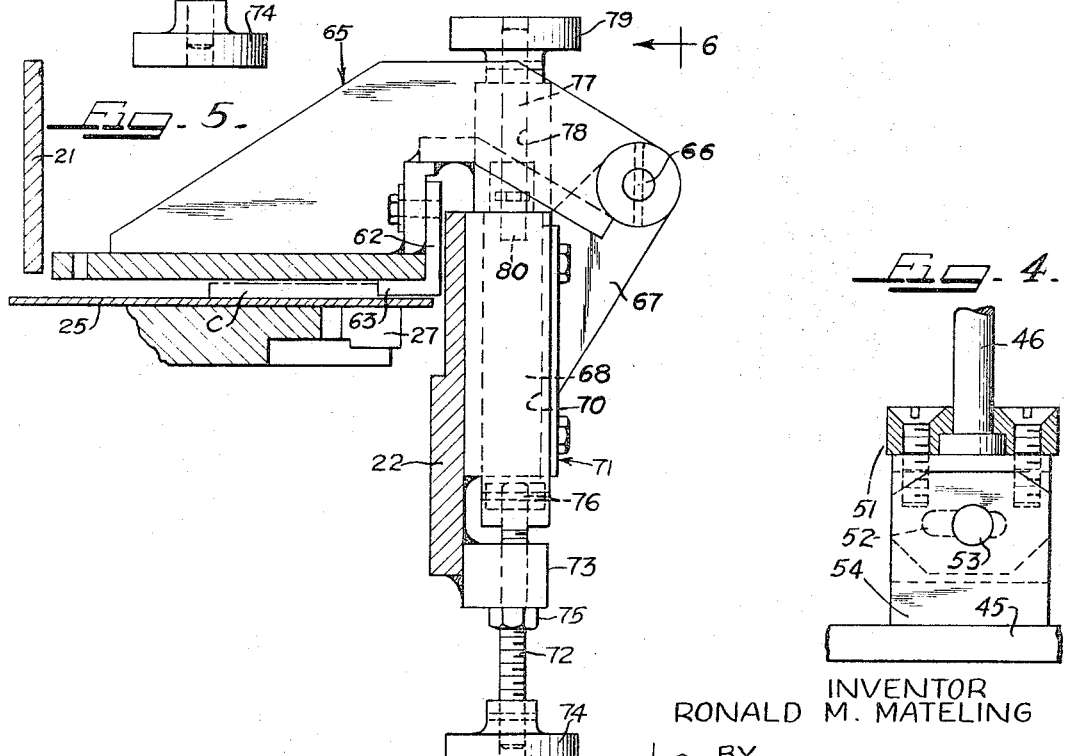

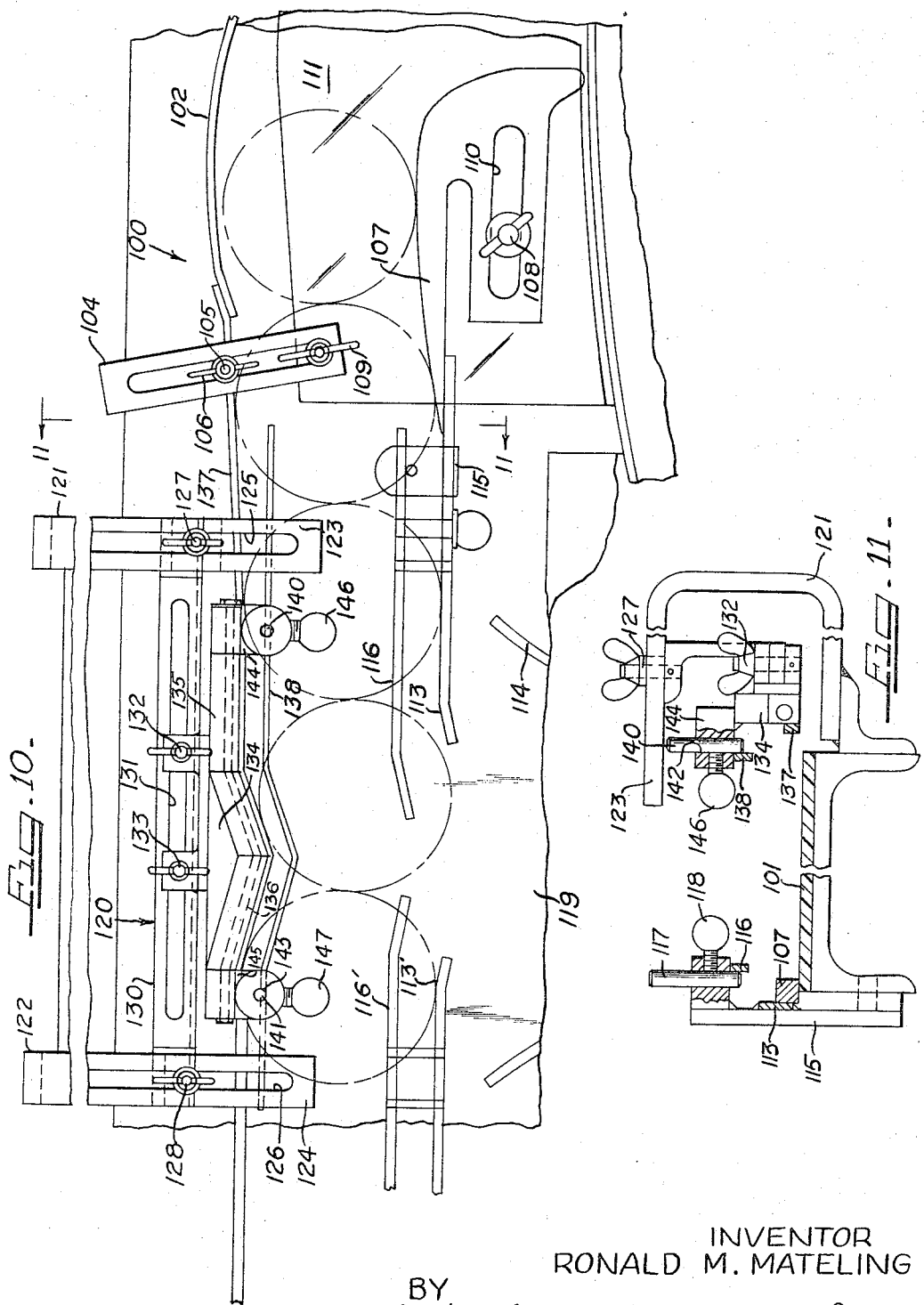

United States Patent Office 3,338,372
Patented Aug. 29, 1967

3,338,372
ROTARY CAP FEEDING HOPPER
Ronald M. Mateling, Chicago, Ill., assignor to Continental Can Company, Inc., New York, N.Y., a corporation of New York
Filed Sept. 30, 1965, Ser. No. 491,727
20 Claims. (Cl. 198—33)

This invention relates to article positioning and feeding apparatus and is more particularly concerned with improvements in a hopper and associated apparatus for feeding and positioning closure caps of the kind utilized for the closing or sealing of packing vessels such as jars, bottles and the like.

Various devices have heretofore been developed for feeding and arranging or positioning closure caps so as to maintain a supply thereof in a guideway or chute leading to a sealing machine or the like with successive caps presented in a predetermined order for application to the jars or other containers to be capped. Since automatic sealing or capping machines require that the caps be delivered at a rate determined by the capping machine, the device for supplying the caps must be capable of performance rates corresponding to or exceeding the performance rate of the capping machine and at the same time it must be operable to provide the caps only as fast as they are used. Also, the cap feeding apparatus must be capable of handling the caps at the required speed without deforming or otherwise damaging caps passing through the apparatus when there is any malfunctioning of the capping machine which interrupts the capping operation and stops the flow of caps to the apparatus. Some of these devices have included a hopper into which the caps are delivered in random arrangement together with associated apparatus which selects caps positioned in a predetermined manner for delivery from the hopper into the feed chute which leads to the capping machine. Also, cap turning devices have been developed for association with such equipment which re-orient improperly positioned caps which the selector device rejects so that these may be fed to the capping machine in the proper position for application to the jars. Much of this equipment which heretofore has been developed has not been entirely satisfactory, mainly because it requires too much attention, and for various other reasons. Therefore, it is a general object of the present invention to provide an improved cap feeding hopper and associated apparatus which will operate continuously, so long as caps are supplied to the hopper, to automatically feed caps from the hopper in properly oriented position for application to the jars being handled by the capping machine and which will automatically remove from the feed line caps in excess of the number required for operation of the capping machine.

It is a more specific object of the invention to provide an improved hopper and associated cap handling apparatus which will deliver caps to an automatic sealing machine in proper position for application to the jars or other vessels which are to be sealed at a rate determined by the rapidity with which they can be accepted by the sealing machine and without subjecting the caps to scraping and scratching which will mar the coating and/or decoration on them.

It is a further object of the invention to provide an improved cap feeding and orienting mechanism which comprises a hopper for receiving a supply of the caps in random arrangement and having means for delivering the caps in single file relation to a discharge area where caps facing in one direction are discharged by a selector device into a cap feed chute while caps facing in the opposite direction are allowed to pass the discharge opening and proceed to a cap turnover device which turns the caps and delivers them back to the hopper where they are again advanced in single file formation to the discharge area for removal by the selector device.

It is another object of the invention to provide a cap handling apparatus which includes a hopper having a rotating disc with associated devices for receiving the caps in random arrangement and for delivering the caps in a single line at the top of a chute leading to a capping machine or the like, a cap sensing and selector device at the entrance to the chute which will turn into the chute caps facing in one direction and allow caps facing in the other direction to proceed to a cap orienting device which turns the caps so that they face in the opposite direction and returns them to the rotating disc in the hopper.

It is still another object of the invention to provide in a cap feeding and orienting apparatus a hopper which receives a supply of caps in random arrangement, a disc mounted within the hopper for rotation in an inclined plane and having a plurality of magnets spaced about the peripheral margin thereof, a co-operating guide means for causing the caps to be arranged in a single line on the peripheral margin of the disc for advance to a cap sensing and selecting device which removes from the line caps facing in one direction while allowing caps facing in the opposite direction to continue to a cap turnover device mounted adjacent the disc through which the caps are passed so that they are turned over and repositioned on the disc for return to single file arrangement and a second presentation to the cap sensing and selecting device.

Another object of the invention is to provide a cap handling apparatus which includes a hopper having a rotating disc on which the caps are adapted to be carried, a cap supply bin from which the caps are fed to the hopper and a wobble plate interposed between the bin and the rotating disc which has at least one opening for the passing of caps at a desired rate to the rotating disc whereby to control the flow of caps to the rotating disc and also to gently agitate the caps in the supply bin.

A further object of the invention is to provide in a cap handling apparatus a hopper having a rotating disc therein for receiving caps on the face thereof, a cap supply bin associated with the hopper and a wobble plate rotatably mounted between the hopper and the supply bin with at least one opening for passing caps from the bin to the hopper and the size of the opening being adjustable so as to vary the feeding of various size caps to the rotating disc at the desired rate of flow.

It is a further object of the invention to provide a cap positioning and feeding device which includes a hopper with associated mechanism for positioning the caps for delivery in a single line to a cap sensing and selector device which transfers from the hopper to a cap feed chute those caps which are in properly oriented position for application to the tops of jars or other receptacles while improperly oriented caps remain in the hopper, and the cap feed chute having a means for returning caps to the hopper when the flow of caps in the feed chute is stopped or slowed down so that the feed chute cannot handle all the caps transferred to it by the sensing and selector device.

It is another object of the invention to provide an apparatus for feeding caps from a supply hopper to a capping machine or the like wherein the apparatus includes a feed chute having a passageway for caps advancing in single file and a bypass for directing caps back into the hopper when the flow of caps in the passageway is stopped or slowed down so that there is an excess of caps delivered to the feed chute.

Another object of the invention is to provide a cap feeding chute in which caps are advanced in single file formation wherein the chute has an outlet opening in a lower side thereof and a magnet in the upper side of the chute which normally holds the caps in alignment for advance in the chute together with a diverter device at the opening for moving the caps out of alignment so that when the flow of caps in advance of the diverter is stopped succeeding caps will be forced out of line and away from the influence of the magnet so as to be ejected through the opening by pressure of oncoming caps on the trailing side of the diverter.

These and other objects and advantages of the invention will be apparent from a consideration of the cap handling apparatus which is shown by way of illustration in the accompanying drawings wherein:

FIGURE 1 is a front elevation, with portions broken away, of a closure cap hopper and associated cap orienting and feeding mechanism;

FIGURE 2 is a vertical section taken on the line 2—2 of FIGURE 1;

FIGURE 3 is a fragmentary cross section taken on the line 3—3 of FIGURE 1, to an enlarged scale and with portions broken away;

FIGURE 4 is a fragmentary cross section taken on the line 4—4 of FIGURE 3;

FIGURE 5 is a fragmentary cross section taken on the line 5—5 of FIGURE 1, to an enlarged scale;

FIGURE 6 is a fragmentary elevation, the view being taken on line 6—6 of FIGURE 5;

FIGURE 7 is a fragmentary cross section taken on the line 7—7 of FIGURE 1, to an enlarged scale;

FIGURE 8 is a fragmentary cross section taken on the line 8—8 of FIGURE 1, to an enlarged scale;

FIGURE 9 is a fragmentary cross section taken on the line 9—9 of FIGURE 1, to an enlarged scale;

FIGURE 10 is a fragmentary plan view, to an enlarged scale, showing the entrance end of the feed chute;

FIGURE 11 is a section taken on the line 11—11 of FIGURE 10; and

FIGURE 12 is a fragmentary perspective view showing the selector device at the discharge opening in the hopper wall.

Referring first to FIGURES 1 and 2 of the drawings, the apparatus illustrated comprises a hopper 10 and associated mechanism which is supported on an upright pedestal 11 so as to be disposed in an inclined plane. The hopper 10 is adapted to receive the caps from an upwardly opening supply bin 12 which extends from the face thereof and into which the caps are dumped in miscellaneous array. A cap feed chute assembly 15 having an L-shaped upper end is supported adjacent the hopper so as to receive a line of caps from a discharge area near the top of the hopper 10 and at the upper end of the chute 15. The chute 15 is adapted to deliver the caps to a capping machine or the like.

The hopper 10, which receives a supply of the caps C in random position or miscellaneous array, comprises an upwardly opening, cylindrical tray or bowl-shaped receptacle or base 16 which is secured in fixed relation on the top of the upwardly extending post or pedestal 11. The hopper base member 16 is preferably supported on the pedestal 11 so that it is in a plane suitably inclined, for example, as shown, in the neighborhood of 70°, relative to the horizontal. A cover forming plate member 17 of semi-circular shape is secured on the bottom half of the upper face of the base member 16 in spaced relation to the bottom plate portion 18 of the latter. The cover plate 17 has an upstanding flange 19 on its inner edge which forms the lower half of a cylindrical section 20. A co-operating upper half cylindrical section 21 is attached to the ends of the flange 19 so as to form with the flange 19 an inwardly and forwardly opening compartment forming cylindrical section 20 concentric with and spaced inwardly of the peripheral wall 22 of base member 16. The cap supply bin or chute 12 is attached to an outer rim or flange on the center cylinder 20 with the bottom thereof slanted towards the base member 16 so as to direct the caps into the funnel forming center cylinder 20.

A cap lifting or carrying disc 25 (FIGURE 2) is mounted for rotation in the base 16 on the center shaft 26 which extends normal to the plane of the base 16 and the cap lifting disc 25. The disc 25 has a plain top face and two rows of magnets 27 are mounted in alternate, circumferential spaced relation about the margin thereof. The face of the disc 25 is spaced from the inside face of the cover plate 17 a distance slightly greater than the depth of the cap C being handled so as to permit the caps to drop by gravity into the space 28 between the disc 25 and the plate 17 at the bottom of the hopper so that a plurality of the caps are held by the magnets 27 on the face of the disc 25 in random position, or arrangement, and are carried in the direction of the top of the hopper. A wobble plate 30 is mounted on the shaft 26 with a plurality of cap receiving apertures 31 and a depending peripheral flange 32 so as to meter the caps through the apertures 31 into the space between the wobble plate 30 and the disc 25 and to act to gently agitate the caps in the bin 12 and thereby insure a continuous flow of the caps from the supply bin 12 into the hopper. Each of the apertures 31 in the wobble plate 30 has a gate forming plate 31' mounted in sliding relation therein which permits the size of the aperture 31 to be adjusted so as to vary the feeding of various size caps at the desired rate of flow through apertures 31 and onto the disc 25.

The outer peripheral wall 22 of the hopper is provided with a discharge opening 33 (FIGURE 2) at the top of the hopper and a single file forming guide assembly 35 is mounted on the approach side of the discharge opening 33. The single file forming assembly 35 (FIGURE 3) is mounted on a cover plate 36 forming part of a support bracket 37 hinged at 38 to a mounting bracket 39 extending outwardly of the hopper wall 22. The bracket plate 36 carries an inner guide bar 40 which is adjustably mounted thereon by means of a pair of upstanding posts 41 extending through spacer sleeves 42 and parallel elongate slots 43 in the plate 36. The posts 41 are threaded at their upper ends to receive thumb nuts 44 for securing the guide bar 40 in adjusted position where it is properly spaced from the hopper wall 22 to permit the passage between the same of a line of caps C in single file relation. A top guide bar 45 is mounted at its ends on the lower ends of a pair of depending bolts 46 (FIGURES 3 and 4) which are spaced in the direction of travel of the caps. The bolts 46 each extend through a vertical bore 47 in a bracket forming lug 48 on one of the upstanding brace forming rib members 49 on the plate 36 and receives at the upper end thereof an operating knob and an adjusting nut 50 to permit vertical adjustment for properly positioning the top guide bar 45. Each bolt 46 is freely turnable in a small captive block 51 at its lower end in which there is an elongate slot 52 in which a pin 53 is received which pin 53 extends between the upstanding legs of a bifurcated block 54 attached to the top face of the bar 45. The bracket plate assembly 36 carries a pin 55 which is slidably mounted in the bore 56 in a bracket member 57. The pin 55 has a threaded lower end which engages in a threaded socket 58 in the stop block 59 on the wall 22 when the bracket plate assembly 36 is in operative position. The bottom of the bracket member 57 is recessed at 60 and bolt 55 carries a stop washer 61 to limit its vertical movement when disengaged. The bolt 55 serves to lock the bracket 36 in proper position for operation while the bar 45 is raised or lowered, according to the size of the cap.

A small angle member 62 (FIGURES 1 and 5) having one flange 63 of triangular shape is mounted on a bracket forming cover plate assembly 65 which is disposed at the approach to the single file guide assembly 35. The triangular shaped flange 63 forms a deflector spaced a predetermined distance from the end of the guide bar 40 when in the operative position shown in FIGURE 1, so as to insure that successive caps will not become diametrically aligned between the end of the guide bar 40 and the side wall 22 and cause a jam which prevents the entrance of caps into single file arrangement on the outside of the guide bar 40. The deflector member 63 is supported on the bracket assembly 65 (FIGURES 1, 5 and 6) which is hinged at 66 to a support bracket 67 extending outside of the wall 22 of the hopper. The support bracket 67 is mounted on a slide member 68 for vertical adjustment. The slide 68 is vertically adjustable in a vertically extending guideway 70 in a housing 71 secured on the hopper wall 22. An adjusting screw 72 for the slide 68 is mounted in a bracket member 73 secured on the wall 22 and is provided with a hand knob 74 and a locking nut 75, the upper end of the screw 72 being captively secured in rotatable relation to the lower end of the slide block 68 by rotatable connection at 76. The bracket assembly 65 carries a locking screw 77 which is slidably mounted in the vertical bore 78 with its lower end adapted to be engaged in a threaded bore 80 in the upper end of the slide member 68 in the same manner as the locking screw 55. This enables the plate assembly 65 to be adjusted vertically and held in operative position above the cap carrying disc 25.

The cap discharge aperture 33 (FIGURES 2, 10 and 12) at the upper side of the hopper wall 22 has associated with it a cap sensing or selector device 85 which is in the form of a triangular spring plate member with a bent up pointed end 86 as shown in FIGURE 12. The selector device is supported on the bracket 87 secured on the bottom wall 18 of the hopper 16 with the bent over end 86 of the spring plate member extending into the path of the single line of caps C as they move in single file toward the discharge end of the guide mechanism 35. Caps C which are advancing with their open bottom faces against the carrier disc 25 push the rim portion thereof over the bent end 86 of the spring plate and the end 86 of the selector snaps into the open face and causes the cap to pivot about the end and through the opening 33. Caps which have their top panels in engagement with the disc 25 merely push the end 86 of the selector 85 aside and continue to be advanced by the rotation of the disc 25 to a turnover device 90 (FIGURES 1, 7, 8 and 9) which is mounted beyond the discharge opening immediately above the disc 25. The turnover device 90 comprises two curved wall members 91 and 92 which confront each other and co-operate to form a curved channel or passageway 93 into which the caps are advanced by the disc 25 beneath a top guide plate 94 mounted on the single file assembly 35 and through which passageway they progress while turning about an edge thereof through 180° so that their position relative to the disc 25 is reversed. As caps emerge from the turnover device 90, they are positioned on the outer margin of the disc 25 with the bottom of each cap facing the disc and held by the magnets 27 in position for removal by the selector device 85 when they are again advanced around to the discharge opening 33.

The hopper shaft 26 which carries the cap lifting or carrying disc 25 and the wobble plate 30 for metering the caps into the hopper from the supply bin 12 is rotated by a conventional drive mechanism, for example, as described in the copending application of Ben G. Daniels and Helmuth E. Raatz, Jr., Serial No. 365,713, filed May 7, 1964, such mechanism including a motor drive unit 95 (FIGURE 2) and a belt and pulley driven speed change gear box unit 96, the power output shaft of which is the shaft 26. If desired, the gear box unit 96 may be of the variable speed type so that the speed of shaft 26 can be regulated. Alternatively, the belt and pulley drive from the motor to the gear box can be of the common variable speed type in order to provide for regulation of the speed of shaft 26.

The feed chute 15, as illustrated in FIGURES 1, 2, 10 and 11, has a top section 100 with an opening in the side edge at the end thereof which is aligned with the discharge opening 33 in the peripheral side wall 22 of the hopper 10 so as to receive caps directed through the opening 33 by the selector device 85. The bottom or floor 101 of the chute 15 is disposed on an inclined plane preferably somewhat below the plane of the disc 25 as indicated in FIGURE 2 and is surfaced with a slippery plastic or other friction reducing material. The feed chute 15, including the top section 100, is provided with guide members for directing the caps in a single line or a single file path. At the entrance end of the top section 100 an outside edge guide 102 is adjustably mounted on angle-type brackets 103 and 104, the latter having slotted top legs extending above the chute frame for receiving upstanding mounting studs and associated thumb nuts 105 and 106 on the guide member 102. A curved inside edge guide rail member 107 forms the inside edge or lowermost wall of the chute and is supported on an upstanding pin 108 extending through an elongate slot 110 in a top guard plate 111 so that the guide member 107 may be adjusted to vary the width of the guideway and accommodate caps of different diameters. The top guard plate 111, which may be a transparent plastic or perforated opaque material to permit inspection of the caps beneath the same, is also mounted on the brackets 103 and 104 by stud and thumb nut connections indicated at 109 and on an angle bracket 112 on the side wall 22 of the hopper with a similar connection. An inside edge or bottom skirt guide 113 extends from the pointed end of the guide member 107 to an excess or overflow cap discharge chute 114 which feeds excess caps back into the hopper 10. The skirt guide 113 is supported on a bracket-like post 115 (FIGURES 10 and 11) upstanding from the frame of the chute. The post 115 also supports a top guide or guard rail 116. The rail 116 has an upstanding pin 117 which is slidable in a vertical bore in the top of the support post 115 and held in adjusted position by a thumb screw 118. At the other side of the chute 114 a post 115' supports a skirt guide 113' and a top guide 116' in an identical manner which guides are aligned with the guides 113 and 116, the guides 113 and 113' having their ends spaced a sufficient distance to provide an opening or entrance 119 into the chute 114 for passage of excess caps. A magnet assembly 120 is incorporated in the guide rail structure on the uppermost side of the chute 15, opposite the opening 119 into the chute 114. The assembly 120 is adjustably mounted on a pair of spaced, U-shaped brackets 121 and 122 (FIGURES 10 and 11) which extend transversely of the chute and have top legs 123 and 124 which overlie the cap guide way and which have elongate slots 125 and 126 for receiving upstanding clamping studs 127 and 128 and associated thumb nuts on the ends of an elongate bracket member 130. The bracket member 130 has an elongate slot 131 for receiving a pair of spaced upstanding clamping studs 132 and 133 on a magnet carrying bracket 134. A magnet 135 is supported on the bracket 134 which has a portion 136 angled or bowed so as to project into the cap guideway with a cap skirt engaging bar 137, the latter causing the caps to move in a path where they are non-aligned opposite the opening 119 into the chute 114. The bracket 134 also supports a top guide bar member 138 which is secured on the bottom of a pair of spaced, upstanding mounting pins 140 and 141 slidably received in vertical bores 142 and 143 in supporting blocks 144 and 145 on the top of the support bracket 134 and held by set screws 146 and 147 in vertically adjusted position. The mounting arrangement permits adjustment of the width of the cap guideway, the height of the top guide bars and the longitudinal position of the magnet assembly 135 so as to accommodate caps of various dimensions. The main body of the chute 15 is provided with skirt engaging side edge forming guides 148 and 149 which are mounted on suitable support brackets so as to co-operate with the guide members previously described in providing a passageway for the caps to advance in the chute. The guide 148 is adjustably mounted so as to accommodate the size cap being handled and a top guide plate (not shown) may be employed which serves as a cover for the chute. The caps entering the chute 15 through the hopper discharge opening 33 normally advance through the chute section 100 and continue in a continuous stream to the discharge end of the chute 15, the magnet 135 having sufficient attraction for the caps to hold them against the top skirt guide rail 137 as they advance past the chute opening 119. When the flow of caps is stopped downstream of the magnet assembly 120 the pressure of oncoming caps is sufficient to overcome the pull of the magnet 135 and succeeding caps are squeezed out of line and caused to enter the chute 114 which leads back to the bin 12 of the hopper 10 as shown in FIGURE 1 so that the excess caps are automatically delivered back to the hopper 10 where they are free to pass through the wobble plate 30 and onto the disc 25.

In using the apparatus, the caps C are dumped into the hopper chute 12 in random arrangement and are fed by gravity through the apertures 31 in the wobble plate 30 to the disc 25 in the hopper 10. They fall into the space 28 at the bottom of the hopper and form a line which is held flat against the disc 25 by the magnet 27 along the outer perimeter of the disc 25. They are carried by rotation of the disc 25 toward the top of the hopper with a single line being retained on the margin of the disc 25 by the magnets 27. As the caps advance and approach the single file forming apparatus 35, they are moved out of alignment by the deflector member 63 so that there is no chance of diametrical alignment of successive caps and consequent jamming in the opening to the singe file forming device 35. The caps advance through the single file forming device 35 to the selector device 85 which pivots caps having their open face toward the disc 25 through the discharge opening 33 in the side wall 22 of the hopper. Caps carried with their open faces upwardly of the disc 25 pass over the selector device 85 and into the turnover device 90 through which they drop by gravity and turn through 180° so that when the caps emerge from the turnover device 90 they are disposed with the open face against the disc 25 which advances the turned over caps in the direction of the selector device 85. The caps which are pivoted out of the hopper through the discharge opening 33 by the selector device 85 are advanced in the chute 15 by pressure of oncoming caps. The magnet device 135 holds the caps against the uppermost skirt engaging guide rail so that they normally advance in the chute in single line arrangement so long as caps are discharged from or advanced in the chute 15 at a rate sufficient to accommodate the caps passing through the hopper discharge opening 33. When the flow of caps is interrupted and the chute 15 becomes filled, the pull of the magnet 135 is overcome by the pressure of oncoming caps delivered from the hopper and the caps are diverted through the opening 119 into the return chute 114 which delivers them back to the hopper 10.

The chute 15 and the associated cap diverting apparatus may be supplied with caps by other cap handling equipment which will deliver caps to the same properly oriented for application to containers or for delivery to any other equipment, storage container or the like.

The hopper and chute combination, of course, operates continuously and automatically so long as a supply of caps is delivered to the entrance chute 12 and normally the apparatus requires no attention. The combination of the hopper with the chute and the associated diverter device enables caps to be supplied automatically to a capping machine or the like in a continuous manner.

While particular materials and specific details of construction have been referred to in describing the form of the apparatus shown, it will be understood that other materials and equivalent structural arrangements may be resorted to within the spirit of the invention.

I claim:
1. Apparatus for handling metal closure caps comprising a hopper having a circular plate in the bottom thereof which is rotatably mounted for movement in an inclined plane and which has magnets spaced about the peripheral margin thereof for holding caps in flat engagement on the uppermost face of the plate margin, means for supplying caps to the hopper in miscellaneous array, means for rotating said plate so as to lift the caps which are held on the top face thereof by magnetic attraction to a discharge opening adjacent the top of the plate, means associated with said cap carrying plate for confining the caps to a single line as they approach said discharge opening, means at the discharge opening for selecting caps facing in one direction and guiding the same through said discharge opening, means forming an inclined cap feed chute which has an upper cap receiving end aligned with the discharge opening so as to receive caps discharged through said opening, a cap orienting device disposed beyond the discharge opening for turning caps facing in the opposite direction and returning them to the peripheral margin of said plate where they are held by magnetic attraction and lifted toward the discharge opening by rotation of said plate, and said cap feed chute having a bypass opening in its upper end with means operative when the feed chute is filled with caps for directing excess caps through said discharge opening and into said hopper.

2. Apparatus for automatically supplying metal closure caps in a continuous stream in a cap feed chute, said apparatus comprising a hopper having a circular plate in the bottom thereof which is rotatably mounted for movement in an inclined plane, magnets spaced about the peripheral margin of said plate for holding caps on the uppermost face of the plate margin, means for supplying caps to the hopper in miscellaneous array, means for rotating said plate so as to lift the caps which are held on the top face thereof by magnetic attraction to a discharge opening adjacent the top of the hopper, means associated with said cap carrying plate for guiding the caps into a single line as they approach said discharge opening, means at the discharge opening for selecting caps facing in one direction and ejecting the same through said discharge opening, means forming an inclined cap feed chute which has an opening in an upper cap receiving end aligned with the hopper discharge opening so as to receive caps ejected through said hopper discharge opening, a device disposed beyond the hopper discharge opening for inverting caps remaining on said cap carrying plate and repositioning them on the peripheral margin of said cap carrying plate where they are held by magnetic attraction and lifted toward the discharge opening by continued rotation of said cap carrying plate, and said cap feed chute having a bypass opening in its upper end with means normally holding caps in the chute and operative when the feed chute is filled for positioning excessive caps for passage through said bypass opening and into said hopper.

3. Apparatus for handling metal closure caps comprising a hopper having a circular plate in the bottom thereof which is rotatably mounted for movement in an inclined plane and which has magnets spaced about the peripheral margin for holding caps flat against the uppermost face of the plate margin, means for supplying caps to the hopper in random arrangement, means for positioning the caps in flat engagement with the upper face of said circular plate, means for rotating said plate so as to lift the caps held thereon by magnetic attraction to a discharge opening adjacent the top of the path of said plate, means adjacent the discharge opening for directing the caps on said plate into a single line as they advance to the discharge opening, cap selecting means at the discharge opening for directing caps facing in one direction through said opening while allowing caps facing in the opposite direction to be carried by said plate past said discharge opening, cap orienting means disposed above the margin of said plate beyond said discharge opening for turning caps carried past said discharge opening so that they face in the direction relative to the plate for discharge through said opening when lifted thereto by further rotation of said plate.

4. Apparatus for handling metal closure caps comprising a hopper having a peripheral side wall and a circular plate in the bottom thereof which is rotatably mounted for movement in an inclined plane, magnets spaced about the peripheral margin of said plate for holding caps on the uppermost face of the plate margin, means for supplying caps to the hopper in miscellaneous array, means for arranging the caps in a single plane along the margin of said plate, means for rotating said plate so as to lift the caps which are held by magnetic attraction thereon to a discharge opening adjacent the top of the hopper, means associated with said plate for moving the caps into a single line on the margin of said plate as they approach said discharge opening, means at the discharge opening for selecting caps which are arranged with the top panel facing uppermost and for guiding the same through said discharge opening, means forming an inclined cap feed chute with its upper end having a cap receiving opening aligned with the hopper discharge opening, a cap orienting device disposed beyond the discharge opening for turning caps which are arranged with the top panel facing in the opposite direction and returning them to the plate where they are held by magnetic attraction and lifted toward the discharge opening by said plate, and said cap feed chute having a bypass opening in its upper end and means operative when the feed chute is overflowing with caps for directing excess caps through said bypass opening and into said hopper.

5. Apparatus for handling metal closure caps comprising a bowl-like hopper having a peripheral side wall and a circular plate in the bottom thereof which plate is rotatably mounted for movement in an inclined plane, magnets spaced about the peripheral margin of said plate for holding caps thereon which are arranged in flat engagement with the uppermost face of the plate margin, means for supply caps to the hopper in random arrangement, means for spreading the caps in a single plane on the plate margin at the bottom of the hopper, means for rotating said plate so as to lift caps held by magnetic attraction on the face thereof to a discharge opening adjacent the top of the hopper side wall, means adjacent the discharge opening for directing the caps on the plate into a single line as they advance to the discharge opening, cap selecting means at the discharge opening for directing caps facing the plate in one direction through said opening while allowing caps facing in the opposite direction to be carried past said opening, and cap orienting means disposed above the face of said plate beyond said discharge opening for receiving caps carried past said discharge opening by said plate and for orienting said caps as they move through said orienting means so that they face in the direction relative to the plate for discharge through said opening when lifted thereto by further rotation of said plate.

6. Apparatus for automatically orienting and feeding metal closure caps in predetermined position comprising a hopper having a peripheral side wall and a circular disc in the bottom thereof which is rotatably mounted for movement in an inclined plane, magnets spaced about the peripheral margin of said disc for holding caps flat against the uppermost face thereof, means for supplying caps to the hopper in random arrangement, means for rotating said disc so as to lift caps held by magnetic attraction on the face thereof to a discharge opening in the side wall adjacent the top of the hopper, means adjacent the discharge opening for directing the caps on the margin of the disc into a single line along said side wall as they advance to the discharge opening, cap selecting means at the discharge opening for directing caps facing in one direction relative to the disc through said discharge opening while allowing caps facing in the opposite direction to be carried by said disc past said discharge opening, cap orienting means disposed along the margin of said disc beyond said discharge opening for reversing the position of caps carried past said discharge opening by rotating the same about a peripheral edge so that they face in the direction relative to the disc for discharge through said opening by cap selecting means when lifted thereto by further rotation of said disc, said cap feed chute having an opening in the bottom edge at the upper end of the chute which communicates with said hopper and means at said chute opening for directing caps therethrough when said chute is filled with caps beyond said opening.

7. Apparatus as recited in claim 6, and a cap feed chute associated with said hopper, said cap feed chute having means forming a guideway for the caps with an entrance opening at the upper end which is aligned with the discharge opening in the upper portion of the side wall of the hopper, said feed chute having a bottom wall in an inclined plane along which the caps travel in flat engagement and a lower side edge wall with an opening into a bypass chute which empties into the hopper, and means for diverting caps through the opening into said bypass chute when an excessive number of caps are discharged from the hopper into said feed chute.

8. Apparatus as recited in claim 7, and said cap feed chute having means for holding caps in the chute so that they advance past said bypass opening when the flow of caps in the feed chute is at a rate sufficient to take away all the caps discharged from the hopper.

9. Apparatus as recited in claim 7, and said cap feed chute having a magnet disposed opposite said bypass opening for holding caps in line to advance past said bypass opening when the flow of caps in said chute is at a rate sufficient to take away all the caps discharged from the hopper.

10. Apparatus as recited in claim 9, and a cap diverter in said cap feed chute adjacent said magnet to move each successive cap a predetermined distance toward said bypass opening so that when the chute is filled excess caps will be moved out of line by said diverter and forced by pressure of oncoming caps through said bypass opening.

11. Apparatus for handling metal closure caps comprising a hopper having a cylindrical side wall and a circular plate in the bottom thereof which is rotatably mounted for movement in an inclined plane, magnets spaced about the peripheral margin of said plate for holding caps on the uppermost face of the plate margin, means for supplying caps to the hopper in random arrangement, means for arranging caps in flat engagement with said plate, means for rotating the plate so as to lift the caps held thereon by magnetic attraction to a discharge opening adjacent the top of the hopper side wall, means arranged adjacent said discharge opening for confining the caps to a single line as they advance to the discharge opening, said cap confining means including a guide rail spaced inwardly of a peripherally extending portion of the hopper side wall so as to form a passageway for advance of caps in single file formation while they are held on the plate by magnetic attraction and means at the trailing end of said guide rail for guiding the caps so as to insure that caps advanced thereto by said plate do not become wedged as a result of their alignment between the end of said guide rail and the side wall of the hopper so as to prevent succeeding caps from advancing into said passageway.

12. Apparatus for handling metal closure caps comprising a hopper having a cylindrical side wall and a circular plate in the bottom thereof which is rotatably mounted for movement in an inclined plane, magnets spaced about the peripheral margin of said plate for holding caps on the uppermost face of the plate margin, means for supplying caps to the hopper in random arrangement, means for metering caps onto said plate and positioning them in flat engagement with the top face thereof, means for rotating the plate so as to lift the caps held by magnetic attraction on the margin thereof to a discharge opening adjacent the top of the plate, means arranged adjacent said discharge opening for confining the caps to a single line as they advance to the discharge opening, said cap confining means including a guide rail adjustably mounted in inwardly spaced relation relative to a peripherally extending portion of the side wall of the hopper so as to cooperate with said wall in forming a passageway for advance of caps in single file formation while they are held by magnetic attraction on the face of the plate and means spaced from the trailing end of the guide rail and adjacent the hopper side wall for forcing the caps inwardly from the hopper side wall so that caps do not become diametrically aligned between the end of the guide rail and the hopper wall and prevent succeeding caps from advancing along the outside of the guide rail.

13. Apparatus for handling metal closure caps comprising a bowl-shaped hopper having a cylindrical side wall and a circular plate in the bottom thereof which is rotatably mounted for movement in an inclined plane, magnets spaced about the peripheral margin for holding caps on the face of the plate margin, means for supplying caps to the hopper in random arrangement, means for arranging the caps in flat single plane relation on the plate, means for rotating the plate so as to lift caps held by magnetic attraction on the face thereof to a discharge opening adjacent the top of the hopper, means arranged adjacent said discharge opening for guiding the caps into single file relation along the margin of the plate as they advance to the discharge opening, said cap guiding means including a curved elongate guide rail spaced inwardly in parallel relation with a portion of the hopper side wall so as to form a passageway for caps in single file formation while they are held by magnetic attraction on the plate, a deflector member spaced from the trailing end of said guide rail and extending inwardly from the hopper side wall so as to engage caps which are in circumferential alignment on the plate and move said caps out of alignment whereby adjacent caps do not become wedged between the trailing end of the guide rail and the hopper side wall in a manner to prevent succeeding caps from moving past the end of the guide rail and into the single file passageway.

14. Apparatus for handling metal closure caps comprising a chute having a generally horizontally disposed section with spaced edge guide members for accommodating caps in single file procession, said chute having an inclined floor between the edge guide members so that the caps advance along a lowermost edge guide member, a discharge opening in said lowermost edge guide member and a magnet located on the opposite side of the chute for urging the caps toward the topmost edge guide member so that they advance past said opening, said topmost edge guide member having a portion thereof extending in the direction of said opening so as to force the caps out of alignment in the direction of said opening, whereby when the chute is filled with caps in advance of said magnet succeeding caps will be forced through said opening by the pressure of oncoming caps in the chute.

15. Apparatus for handling metal closure caps comprising a chute having a generally horizontally disposed section with side guide members spaced for accommodating caps in single file procession, said chute having a floor between the side guide members which is inclined so that the caps normally advance along the lowermost side guide member, a discharge opening in said lowermost side guide member and a magnet disposed on the opposite side of the chute for attracting the caps so that they advance past said opening, said topmost side guide member having a portion thereof extending in the direction of said opening so as to cause the caps to move out of alignment and in the direction of said opening, whereby when the chute is filled with caps in advance of said magnet and predetermined pressure is developed by oncoming caps at the trailing side of said magnet caps will be ejected at the opening.

16. Apparatus for feeding metal closure caps comprising a chute having a generally horizontally disposed section with spaced guide members and a floor extending between the same so as to form a passageway for accommodating caps in single file procession, said chute floor being inclined so that the caps advance along the lowermost guide member, a discharge opening in said lowermost guide member and a magnet disposed in the passageway opposite said opening for holding the caps in alignment as they advance past said discharge opening, diverter means in the passageway opposite said opening forcing successive caps out of alignment in the direction of said opening whereby the pressure of oncoming caps will force through said opening caps which are in excess of the number required of said chute.

17. Apparatus for handling metal closure caps comprising a chute having a generally horizontally disposed section with spaced edge guide members for accommodating caps in single file procession, said chute having a floor between the edge guide members which is inclined relative to the horizontal so that the caps advance along a lowermost edge guide member, a discharge opening in said lowermost edge guide member and means for urging the caps toward the topmost edge guide member so that normally they advance past said opening, means associated with said topmost edge guide member extending in the direction of said opening and engaging the caps so as to force the caps out of alignment in the direction of said opening, whereby when the chute is filled with caps excess caps will be forced through said opening by the pressure of oncoming caps in the chute.

18. Apparatus for handling metal closure caps comprising a chute having a generally horizontally disposed section with side guide members spaced for accommodating caps in single file procession, said chute having a floor between the side guide members which is inclined relative to the horizontal so that the caps normally advance between the side guide members, a discharge opening in said lowermost side guide member and a magnet cap attracting means disposed on the opposite side of the chute for holding the caps in single file arrangement so that they advance past said opening, means associated with said topmost side guide member extending in the direction of said opening and into the path of the caps so as to cause the caps to move out of alignment and in the direction of said opening, whereby when the chute is filled with caps in advance of said discharge opening and predetermined pressure is developed by oncoming caps at the trailing side of said discharge opening excess caps will be forced through said discharge opening.

19. Apparatus for handling closure caps comprising a hopper having a rotating disc mounted therein for carrying the caps on the face thereof, a cap supply bin for receiving a quantity of caps for delivery to the hopper, and a rotating wobble plate interposed between the supply bin and the hopper which has at least one opening for passing the caps from the supply bin to the rotating disc at a desired rate whereby to control the flow of caps to the rotating disc and to gently agitate the caps in the supply bin.

20. In a cap handling apparatus, a hopper having a rotating disc therein for carrying the caps on the face thereof, a cap feed bin for receiving a supply of caps for delivery to the hopper, and a rotating wobble plate mounted in the hopper with at least one opening for passing the caps from the feed bin to the rotating disc, and means for adjusting the size of said opening so as to control the feeding of various size caps at the desired rate of flow through the opening to the rotating disc.

(References on following page)

References Cited

UNITED STATES PATENTS

| | | | |
|---|---|---|---|
| 2,532,760 | 12/1950 | Davies | 198—33 X |
| 2,609,912 | 9/1952 | Engel | 221—163 X |
| 2,625,313 | 1/1953 | Resira | 198—33 X |
| 3,044,660 | 7/1962 | Troll et al. | 198—33 X |
| 3,269,514 | 8/1966 | Daniel et al. | 198—41 X |

EVON C. BLUNK, *Primary Examiner.*

A. C. HODGSON, *Assistant Examiner.*